United States Patent
Singh et al.

(10) Patent No.: US 12,513,052 B2
(45) Date of Patent: Dec. 30, 2025

(54) METHODS, SYSTEMS, AND COMPUTER READABLE MEDIA FOR IDENTIFYING, TO NETWORK FUNCTION (NF) DISCOVERY SERVICE CONSUMERS, NF DISCOVERY RESULTS IMPACTED BY AN NF PROFILE UPDATE

(71) Applicant: Oracle International Corporation, Redwood Shores, CA (US)

(72) Inventors: Virendra Singh, Bangalore (IN); Shashikiran Bhalachandra Mahalank, Bangalore (IN); Jay Rajput, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 63 days.

(21) Appl. No.: 18/644,991

(22) Filed: Apr. 24, 2024

(65) Prior Publication Data
US 2025/0337652 A1 Oct. 30, 2025

(51) Int. Cl.
*H04L 41/12* (2022.01)
*H04L 41/122* (2022.01)
*H04L 67/56* (2022.01)

(52) U.S. Cl.
CPC ............ *H04L 41/12* (2013.01); *H04L 41/122* (2022.05); *H04L 67/56* (2022.05)

(58) Field of Classification Search
CPC ........ H04L 41/12; H04L 41/122; H04L 67/56
See application file for complete search history.

(56) References Cited

U.S. PATENT DOCUMENTS

2024/0064197 A1\* 2/2024 Rodrigo ................. H04L 67/51
2025/0158889 A1\* 5/2025 de Gregorio Rodriguez .............. H04L 41/0803

OTHER PUBLICATIONS

"3rd Generation Partnership Project; Technical Specification Group Services and System Aspects; System architecture for the 5G system (5GS); Stage 2 (Release 18)", 3GPP TS 23.501, V18.5.0, pp. 1-716 (Mar. 2024).

(Continued)

*Primary Examiner* — Tonia L Dollinger
*Assistant Examiner* — Joseph M Cousins
(74) *Attorney, Agent, or Firm* — Jenkins, Taylor & Hunt, P.A.

(57) ABSTRACT

A method for identifying cached NF discovery results impacted by an NF profile update to NF discovery service consumers includes receiving an NF discovery request including query parameters, generating an NF discovery response, communicating the NF discovery response to the NF discovery service consumer, and caching information associated with the NF discovery response. The method further includes receiving an NF update message for changing a value of at least one attribute of an NF profile of a producer NF, determining that the change in the value of at least one attribute of the NF profile of the producer NF would have impacted the NF discovery response, updating the cached information associated with the NF discovery response, and communicating, to the NF discovery service consumer, a notification message including the NF profile of the producer NF and identifying the NF discovery response as an impacted NF discovery response.

20 Claims, 9 Drawing Sheets

(56) References Cited

OTHER PUBLICATIONS

"3rd Generation Partnership Project; Technical Specification Group Core Network and Terminals; 5G System; Network Function Repository Services; Stage 3 (Release 18)", 3GPP TS 29.510, V18.6.0, pp. 1412 (Mar. 2024).

* cited by examiner

METHODS, SYSTEMS, AND COMPUTER READABLE MEDIA FOR IDENTIFYING, TO NETWORK FUNCTION (NF) DISCOVERY SERVICE CONSUMERS, NF DISCOVERY RESULTS IMPACTED BY AN NF PROFILE UPDATE

TECHNICAL FIELD

The subject matter described herein relates to efficient updating of NF discovery information. More particularly, the subject matter described herein relates to caching NF discovery information at the NF repository function (NRF) and using the cached information to inform NFs (including service communication proxies (SCPs)) of NF discovery results impacted by an NF profile update.

BACKGROUND

In 5G telecommunications networks, a network function that provides service is referred to as a producer NF or service producer. A network function that consumes services is referred to as a consumer NF or NF service consumer. A network function can be a producer NF, a consumer NF, or both, depending on whether the network function is consuming, producing, or consuming and producing services. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name (FQDN) that resolves to an IP address and port number on a network node that hosts a producer NF. An NF instance is an instance of a producer NF that provides a service. A given producer NF may include more than one NF instance. It should also be noted that multiple NF instances can share the same service endpoint.

NFs register with a network function repository function (NRF). The NRF maintains profiles of available NF instances identifying the services supported by each NF instance. The profile of an NF instance is referred to in 3GPP TS 29.510 as an NF profile. NF instances can obtain information about other NF instances that have registered with the NRF through the NF discovery service operation. According to the NF discovery service operation, a consumer NF sends an NF discovery request to the NRF. The NF discovery request includes query parameters that the NRF uses to locate the NF profiles of producer NFs capable of providing the service identified by the query parameters. NF profiles are data structures that define the type of service provided by an NF instance as well as contact and capacity information regarding the NF instance.

An SCP can also invoke the NF discovery service operation to learn about available producer NF instances. The case where the SCP uses the NF discovery service operation to obtain information about producer NF instances on behalf of consumer NFs is referred to as delegated discovery. Consumer NFs connect to the SCP, and the SCP load balances traffic among producer NF service instances that provide the required services or directly routes the traffic to the destination producer NF instances.

One problem that can occur in 5G and subsequent generation networks relates to the updating of NF discovery results at an NF discovery service consumer, including an SCP in the case of delegated discovery. When an NF discovery service consumer sends an NF discovery request to the NRF, the NF discovery service consumer includes query parameters in the NF discovery request. The NRF receives the NF discovery request and executes its search algorithm using the query parameters to locate one or more NF profiles to include in the NF discovery response. The search algorithm used by the NRF is not known to the NF discovery service consumer. The NRF generates and sends an NF discovery response to the NF discovery service consumer. The NF discovery response includes a validityPeriod attribute, which stores a value indicating a time period during which the results communicated in the NF discovery response are valid. When the time period indicated by the validityPeriod attribute value expires, the NF discovery service consumer is required to refresh the NF discovery results by transmitting a new NF discovery request to the NRF.

When the NRF receives an NF update message from a producer NF, the NRF updates the NF profile of the producer NF based on the changes indicated in the NF update message. The NRF also communicates the updated NF profile to any NF service consumers that have subscribed to receive notification of updates to the NF profile. When the NF service consumers receive a notification message including updates to an NF profile, the NF service consumers may experience difficulties in identifying NF discovery results impacted by the updated NF profile because the NF update message may not identify impacted NF discovery results. Because the notification message may not identify impacted NF discovery results, performing such identification can be a processor-intensive operation on the part of NF discovery service consumers.

Accordingly, in light of these and other difficulties, there exists a need for improved methods, systems, and computer readable media for identifying, to NF discovery service consumers, NF discovery results impacted by an NF profile update.

SUMMARY

A method for identifying, to network function (NF) discovery service consumers, NF discovery results impacted by an NF profile update includes receiving, by an NRF and from an NF discovery service consumer, a first NF discovery request including query parameters. The method further includes generating, by the NRF and based on the first NF discovery request, a first NF discovery response. The method further includes communicating, by the NRF, the first NF discovery response to the NF discovery service consumer and caching, by the NRF, information associated with the first NF discovery response. The method further includes receiving, by the NRF and from a producer NF, an NF update message for changing a value of at least one attribute of an NF profile of the producer NF. The method further includes determining, by the NRF and using the cached information associated with the first NF discovery response, that the change in the value of at least one attribute of the NF profile of the producer NF would have impacted the first NF discovery response and updating the cached information associated with the first NF discovery response. The method further includes communicating, by the NRF and to the NF discovery service consumer, a notification message including the NF profile of the producer NF and identifying the first NF discovery response as an impacted NF discovery response.

According to another aspect of the subject matter described herein, the NF discovery service consumer comprises a service communication proxy (SCP) and receiving the first NF discovery request includes receiving a delegated NF discovery request originating from the SCP according to 3GPP communication model D.

According to another aspect of the subject matter described herein, the NF discovery service consumer comprises a non-SCP NF discovery service consumer and receiving the first NF discovery request includes receiving an NF discovery request originating from the non-SCP NF discovery service consumer using 3GPP communication model B or C.

According to another aspect of the subject matter described herein, generating the first NF discovery response includes performing a lookup in an NF profiles database using the query parameters from the first NF discovery request, locating NF profiles corresponding to the query parameters, and including the NF profiles in the first NF discovery response.

According to another aspect of the subject matter described herein, caching information associated with the first NF discovery response includes caching the query parameters, a list of NF instance identifiers of producer NFs whose NF profiles have attributes that match the query parameters, an NF instance identifier of the NF discovery service consumer, and a searchID associated with the first NF discovery response.

According to another aspect of the subject matter described herein, updating cached information associated with the first NF discovery response includes updating the list of NF instance identifiers of producer NFs whose NF profiles have attributes that match the query parameters.

According to another aspect of the subject matter described herein, determining that the change in the value of at least one attribute of the NF profile of the producer NF would have impacted the first NF discovery response includes determining that the value of the at least one attribute corresponds to one of the query parameters and/or that the NF profile of the producer NF was included in the first NF discovery response.

According to another aspect of the subject matter described herein, communicating the notification message including the NF profile of the producer NF and identifying the first NF discovery response as an impacted NF discovery response comprises including the searchID in the notification message.

According to another aspect of the subject matter described herein, the method for identifying cached NF discovery results impacted by an NF profile update includes receiving, by the NF discovery service consumer, the notification message identifying the first NF discovery response as an impacted NF discovery response and refreshing NF discovery results associated with the first NF discovery response.

According to another aspect of the subject matter described herein, refreshing the NF discovery results associated with the first NF discovery response includes transmitting, to the NRF, a second NF discovery request including the query parameters and/or the searchID and, at the NRF, using the cached information associated with the first NF discovery request that was updated in response to the NF update message to respond to the second NF discovery request.

According to another aspect of the subject matter described herein, a system for identifying, to network function (NF) discovery service consumers, cached NF discovery results impacted by an NF profile update is provided. The system includes an NF repository function (NRF) including at least one processor and a memory. The system further includes an NF profiles data manager implemented by the at least one processor for receiving, from an NF discovery service consumer, a first NF discovery request including query parameters, generating, based on the first NF discovery request, a first NF discovery response, communicating the first NF discovery response to the NF discovery service consumer, caching information associated with the first NF discovery response, receiving, from a producer NF, an NF update message for changing a value of at least one attribute of an NF profile of the producer NF, determining, using the cached information associated with the first NF discovery response, that the change in the value of the at least one attribute of the NF profile of the producer NF would have impacted the first NF discovery response, updating the cached information associated with the first NF discovery response, and communicating, to the NF discovery service consumer, a notification message including the NF profile of the producer NF and identifying the first NF discovery response as an impacted NF discovery response.

According to another aspect of the subject matter described herein, the NF discovery service consumer comprises a service communication proxy (SCP) and the first NF discovery request includes a delegated NF discovery request originating from the SCP according to 3GPP communication model D.

According to another aspect of the subject matter described herein, the NF discovery service consumer comprises a non-SCP NF discovery service consumer and the first NF discovery request includes an NF discovery request originating from the non-SCP NF discovery service consumer using 3GPP communication model B or C.

According to another aspect of the subject matter described herein, the NF profiles data manager is configured to generate the first NF discovery response by performing a lookup in an NF profiles database using the query parameters from the first NF discovery request, locating NF profiles corresponding to the query parameters, and including the NF profiles in the first NF discovery response.

According to another aspect of the subject matter described herein, the NF profiles data manager is configured to cache the query parameters, NF instance identifiers of producer NFs whose NF profiles have attributes that match the query parameters, an NF instance identifier of the NF discovery service consumer, and a searchID associated with the first NF discovery response.

According to another aspect of the subject matter described herein, the NF profiles data manager is configured to update the cached information associated with the first NF discovery response by updating the list of NF instance identifiers of producer NFs whose NF profiles have attributes that match the query parameters.

According to another aspect of the subject matter described herein, the NF profiles data manager is configured to determine that the change in the value of at least one attribute of the NF profile of the producer NF would have impacted the first NF discovery response by determining that the value of the at least one attribute corresponds to one of the query parameters and/or that the NF profile of the producer NF was included in the first NF discovery response.

According to another aspect of the subject matter described herein, the notification message includes the searchID.

According to another aspect of the subject matter described herein, the system includes the NF discovery service consumer and the NF discovery service consumer is configured to receive the notification message identifying the first NF discovery response as an impacted NF discovery response and refresh the first NF discovery response by transmitting, to the NRF, a second NF discovery request including the query parameters and/or the searchID and, at the NRF, using the cached information associated with the first NF discovery request that was updated in response to the NF update message to respond to the second NF discovery request.

According to another aspect of the subject matter described herein, a non-transitory computer readable medium having stored thereon executable instructions that when executed by a processor of a computer control the computer to perform steps is provided. The steps include receiving, by a network function (NF) repository function (NRF) and from an NF discovery service consumer, an NF discovery request including query parameters; generating, by the NRF and based on the NF discovery request, an NF discovery response. The steps further include communicating, by the NRF, the NF discovery response to the NF discovery service consumer. The steps further include caching, by the NRF, information associated with the NF discovery response. The steps further include receiving, by the NRF and from a producer NF, an NF update message for changing a value of at least one attribute of an NF profile of the producer NF. The steps further include determining, by the NRF and using the cached information associated with the NF discovery response, that the change in the value of at least one attribute of the NF profile of the producer NF would have impacted the NF discovery response and updating the cached information associated with the first NF discovery response. The steps further include communicating, by the NRF and to the NF discovery service consumer, a notification message including the NF profile of the producer NF and identifying the NF discovery response as an impacted NF discovery response.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be explained with reference to the accompanying drawings, of which.

DETAILED DESCRIPTION

Figure 1:
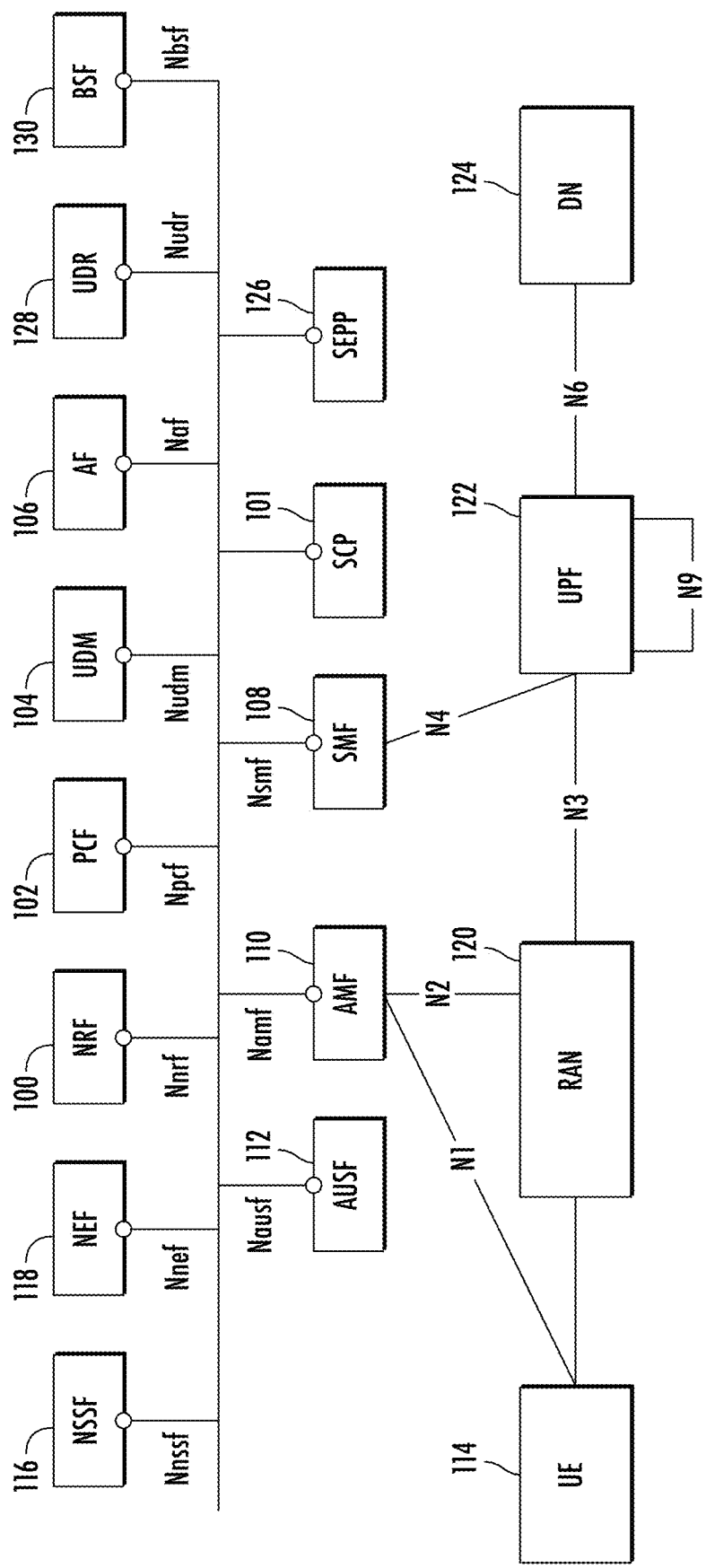
FIG. 1 is a network diagram illustrating an exemplary 5G system network architecture.

FIG. 1 is a block diagram illustrating an exemplary 5G system network architecture. The architecture in FIG. 1 includes NRF 100 and SCP 101, which may be located in the same home public land mobile network (HPLMN). As described above, NRF 100 may maintain profiles of available NF instances and their supported services and allow consumer NFs or SCPs to subscribe to and be notified of the registration of new/updated NF instances. SCP 101 may also support service discovery and selection of NF instances. SCP 101 may perform load balancing of connections between consumer and producer NFs.

NRF 100 is a repository for profiles of NF instances. To communicate with a producer NF instance, a consumer NF or an SCP must obtain the NF profile of the producer NF instance from NRF 100. The NF profile is a JavaScript object notation (JSON) data structure defined in 3GPP TS 29.510. The NF profile includes attributes that indicate the type of service provided, capacity of the NF instance, and information for contacting the NF instance.

In FIG. 1, any of the network functions can be consumer NFs, producer NFs, or both, depending on whether they are requesting, providing, or requesting and providing services. In the illustrated example, the NFs include a policy control function (PCF) 102 that performs policy related operations in a network, a unified data management function (UDM) 104 that manages user data, and an application function (AF) 106 that provides application services.

The NFs illustrated in FIG. 1 further include a session management function (SMF) 108 that manages sessions between an access and mobility management function (AMF) 110 and PCF 102. AMF 110 performs mobility management operations similar to those performed by a mobility management entity (MME) in 4G networks. An authentication server function (AUSF) 112 performs authentication services for user equipment (UEs), such as user equipment (UE) 114, seeking access to the network.

A network slice selection function (NSSF) 116 provides network slicing services for devices seeking to access specific network capabilities and characteristics associated with a network slice. NSSF 116 provides the NSSelection service, which allows NFs to request information about network slices and the NSSAIReachability service, which enables NFs to update and subscribe to receive notification of updates in network slice selection assistance information (NSSAI) reachability information.

A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a gNB (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

A SEPP 126 filters incoming traffic from another PLMN and can perform topology hiding for traffic exiting the home PLMN. SEPP 126 may communicate with a SEPP in a foreign PLMN which manages security for the foreign PLMN. Thus, traffic between NFs in different PLMNs may traverse two SEPP functions, one for the home PLMN and the other for the foreign PLMN. A SEPP filtering egress messages from consumer NFs in a PLMN is referred to as a consumer SEPP or C-SEPP. A SEPP that filters ingress messages directed to consumer NFs in a PLMN is referred to as a producer SEPP or P-SEPP. A given SEPP can function as a C-SEPP and a P-SEPP, depending on the role the SEPP is performing.

A unified data repository (UDR) 128 stores subscription data for UEs. A binding support function (BSF) 130 manages bindings between PDU sessions and PCFs.

As described above, one problem that can occur in 5G and subsequent generation networks is the difficulty that can be experienced by NF discovery service consumers in identifying NF discovery results impacted by an update to an NF profile. The problem is relevant to delegated discovery performed by SCPs according to 3GPP communication model D, but is also relevant to non-delegated discovery performed by non-SCP NF discovery service consumers according to 3GPP communication models B or C.

3GPP Release 16 defines the SCP for 5G service-based interface (SBI) indirect communication according to 3GPP communication model D. To enable the 5G SBI service request model D indirect routing at the SCP, the SCP performs delegated NF discovery from the NRF using discovery headers received in a service request from a consumer NF. The SCP caches the delegated NF discovery responses received from the NRF for a time period equal to a validityPeriod value received in NF discovery responses. According to 3GPP TS 29.510, the validityPeriod shall contain the time in seconds during which the discovery result is considered valid and can be cached by the NF service consumer. 3GPP TS 29.510 also indicates that this value shall be the same as the value contained in the "max-age" parameter of the "Cache-Control" header field sent in the HTTP response.

It should be noted that the NF discovery response contains an array of NF instance profiles matching the search criteria indicated by the query parameters of the NF discovery request. One point to highlight is that any change in NF profile attributes which matched the search criteria (query parameters) in an NF discovery request will change the NF discovery response and may lead to a change in the matching NF profiles or NF profile content in an NF discovery response for an NF discovery request having the same search criteria (query parameters). The query parameters list of a typical NF discovery request can include a long list of parameters, can increase in length with new releases of NF instances, and can vary for each producer NF service selection.

To obtain 5G NF topology information and NF updates, the SCP subscribes for any NF status change notification for all 5GC NF types with any one available NRF instance (as per priority, capacity) in each configured NRF set. The SCP creates and manages subscriptions using the NFStatusSubscribe and NFStatusUnsubscribe service operations. The SCP receives notifications for existing subscriptions via the NFStatusNotify service operation. One point to highlight is that the SCP learns the 5G NF topology deployed in the network via NF status notifications from the NRF, but NF status notification messages may not identify NF profile attributes that have changed. The identification of changed NF profile attributes at the SCP may be a complex and resource intensive operation. In addition, if cached discovery responses at the SCP are not updated as per a received NF status notification due to an NF profile attribute change/update, then this may lead to routing failures, incorrect NF selection, and misrouting of SBI request messages. As a result, there is a need to provide a mechanism to efficiently identify and update cached NF discovery results impacted or affected by an NF profile update.

To address these issues, the NRF caches NF discovery responses, search criteria (query parameters) used to create the NF discovery responses, and the validity time associated with each of the NF discovery responses. During NF update (including NF heart-beat) processing at the NRF, the NRF identifies changed NF profile attributes and impacted NF discovery responses whose validityPeriod has not expired. The NRF notifies the NF discovery service consumer regarding affected delegated discovery responses so that the NF discovery consumer can update/renew the cached delegated discovery responses. The NRF also updates cached NF discovery results associated with the impacted NF discovery responses in the local cache maintained by the NRF so that the updated NF discovery results can be efficiently retrieved by an NF discovery service consumer.

Figure 2:
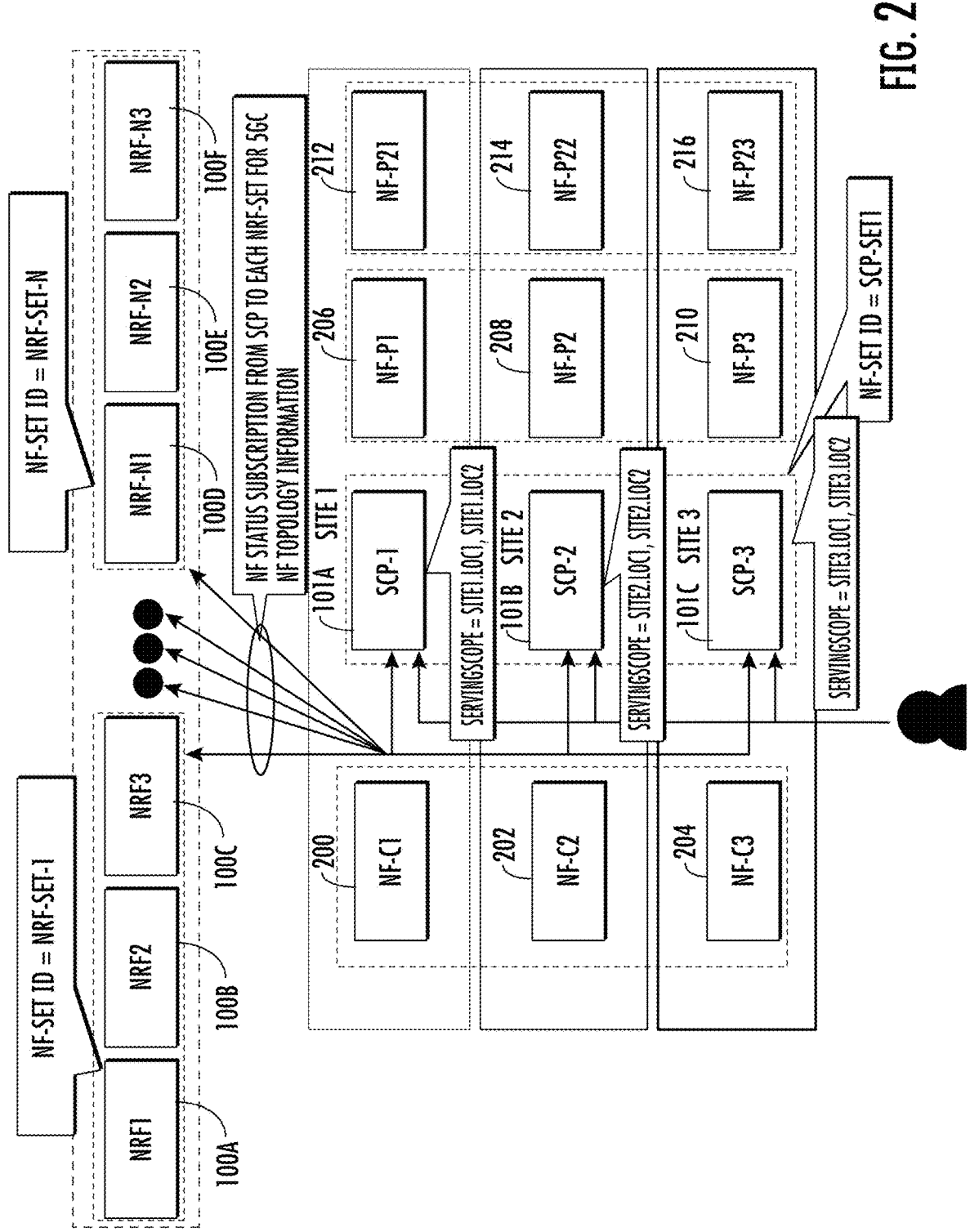
FIG. 2 is a network diagram illustrating SCPs subscribing to receive notifications of NF profile updates from NRFs.

Before discussing the solution in detail, an overview of how the SCP and NF discovery service consumers in general learn of NF topology changes will be provided. FIG. 2 is a network diagram illustrating SCPs subscribing to receive notifications of NF profile updates from NRFs. In FIG. 2, NF service consumers 200, 202, and 204 seek services from NF service producers 206, 208, 210, 212, 214, and 216. To obtain service from NF service producers, NF service consumers 200, 202, and 204 request delegated NF discovery from SCPs 101A, 101B, and 101C. SCPs 101A, 101B, and 101C perform delegated NF discovery via NRFs 100A, 100B, 100C, 100D, 100E, and 100F.

Each SCP 101A, 101B, and 101C registers using the Nnrf_NFManagement services as an SCP or a custom NF type with one of the available NRF instances 100A, 100B, 100C, 100D, 100E, and 100F (as per priority and capacity) in each configured NRF set. Each SCP 101A, 101B, and 101C may use an operator-configurable SCP profile configuration for the registration. Each SCP 101A, 101B, and 101C may also update its NF profile as needed.

Each SCP 101A, 101B, and 101C subscribes (as per priority and capacity) with one of NRFs 100A, 100B, 100C, 100D, 100E, and 100F in each configured NF set for any NF status change notification for all 5GC NF types. Each SCP 101A, 101B, and 101C may create a subscription using the NFStatusSubscribe service operation, delete a subscription using the NFStatusUnsubscribe service operation, and receive notifications pursuant to a subscription using the NFStatusNotify service operation. The NFStatusSubscribe service operation, the NFStatusUnsubscribe service operation, and the NFStatusNotify service operation are all components of the Nnrf_NFManagement service. One point to highlight is that the SCP learns the 5G NF topology deployed in the network via NF status notifications from the NRF.

SCPs 101A, 101B, and 101C may also perform periodic 5G NF topology audits (as per priority and capacity) with any one available NRF instance in each configured NRF set using the Nnrf_NFManagement or Nnrf_NFDiscovery service as the audit service. SCPs 101A, 101B, and 101C periodically synchronize the current available/learned 5G NF topology information at each SCP with NF information available at the respective NRF and take corrective actions if any mismatch/gap is found between the learned NF topology information and the information available at the NRF. After a successful audit, the 5G NF topology at each SCP 101A, 101B, and 101C will be synchronized with the topology information received from NRF during the audit.

Figure 3:
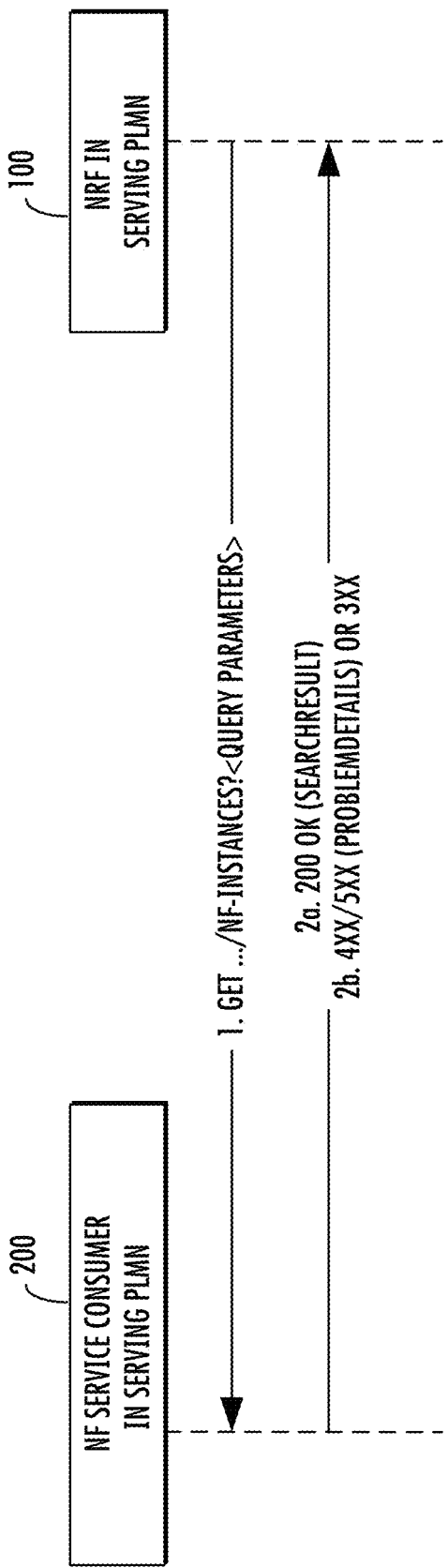
FIG. 3 is a message flow diagram illustrating exemplary messages exchanged in the NFDiscover service operation.

FIG. 3 is a message flow diagram illustrating exemplary messages exchanged in the NFDiscover service operation. This service operation discovers the set of NF instances (and their associated NF service instances), represented by their NF profiles, that are currently registered in the NRF and satisfy a number of input query parameters. The NF service consumer should reuse a previous NF discovery result if input query parameters in the new NF discovery request are the same as the query parameters used for the previous NF discovery request and the validity period of the results from the previous NF discovery request has not expired. The NF discovery request has query parameters which will be used as search filter criteria to process the NF discovery request at the NRF. Any changes in these NF profile attributes may result in a different set of NF profiles or NF profiles with changed attributes in the NF discovery response.

In step 1 of the message flow illustrated in FIG. 3, NF service consumer 200 sends an NF discovery request message to NRF 100. The NF discovery request message includes an HTTP GET method and the query parameters. NRF 100 receives the NF discovery request message and executes its search algorithm using the query parameters. NRF 100 locates one or more NF profiles having attributes that match the query parameters. In step 2a, if NRF 100 successfully processes the NF discovery request, NRF 100 generates and sends an NF discovery response, which includes the NF discovery results. If NRF 100 experiences an error in processing the NF discovery request, NRF 100 responds as indicated in step 2b with a 4xx or 5xx message indicating problem details. If NRF 100 determines that the NF discovery request needs to be redirected, NRF 100 responds with a 3xx message.

Tables 1 and 2 shown below illustrate the contents of the NF discovery response body for a successful NF discovery response.

TABLE 1

NF Discovery Response Body

| Data Type | P | Cardinality | Response Codes | Description |
| --- | --- | --- | --- | --- |
| SearchResult | M | 1 | 200 OK | The response body contains the result of the search over the list of registered NF instances. |

TABLE 2

SearchResult

| Attribute Name | Data Type | P | Cardinality | Description |
| --- | --- | --- | --- | --- |
| validityPeriod | Int | M | 1 | It shall contain the time in seconds during which the discovery result is considered valid and can be cached by the NF Service Consumer. This value shall be the same as the value contained in the "max-age" parameter of the "Cache-Control" header field sent in the HTTP response. |
| nfInstances | Array(NFProfile) | M | 0 . . . N | It shall contain an array of NF Instance profiles, matching the search criteria indicated by the query parameters of the discovery request. If the nfInstancesList IE is absent, an empty array means there is no NF instance that can match the search criteria. |

TABLE 2-continued

| | | | | SearchResult |
|---|---|---|---|---|
| Attribute Name | Data Type | P | Cardinality | Description |
| | | | | NF instance profiles included in this IE shall not contain authorization attributes (such as the "allowedXXX" attributes of the NFProfile or NFService data types). |
| searchID | string | O | 0 . . . 1 | This IE may be present if the NRF stores the result of the current service discovery response in a given URL (server-side caching), to make it available in the future to NF Service Consumers without having to compute the whole search process again. |

From Tables 1 and 2, the NF discovery response includes an array of NF profiles having attributes that match the query parameters in the NF discovery request. The NF discovery response also includes a validityPeriod attribute whose value indicates the time in seconds that the NF discovery response is valid. The NF discovery response also optionally includes a searchID, which is a unique identifier used by the NRF to locate previously stored NF discovery results and respond to NF service consumers without having to perform the search again.

Figure 4:
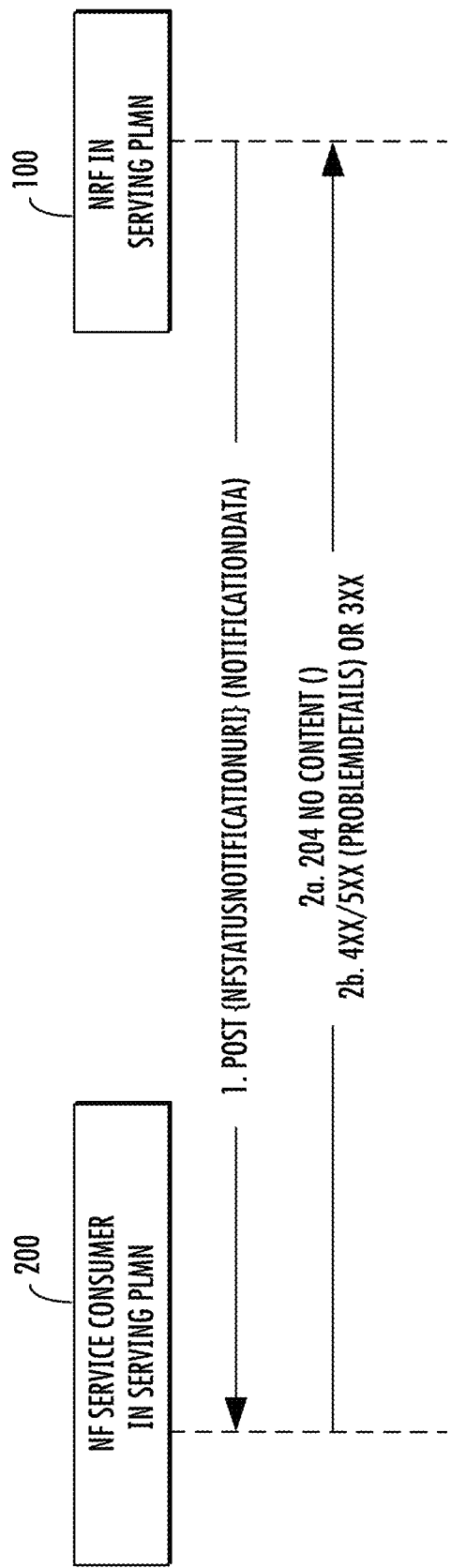
FIG. 4 is a message flow diagram illustrating exemplary messages exchanged in the NFStatusNotify service operation.

FIG. 4 is a message flow diagram illustrating exemplary messages exchanged in the NFStatusNotify service operation. The NRF uses the NFStatusNotify service operation to notify each NF service consumer that was previously subscribed to receive notifications of registration/deregistration of NF instances or notifications of changes of the NF profile of a given NF instance.

Referring to the message flow in FIG. 4, in step 1, NRF 100 determines that a notification should be sent to NF service consumer 200 and sends an NFStatusNotify request message to NF service consumer 200. The NFStatusNotify request message includes NotificationData. Tables 3 and 4 shown below illustrate the content of the NFStatusNotify request message.

TABLE 3

| | NotificationData | | |
|---|---|---|---|
| Data Type | P | Cardinality | Description |
| NotificationData | M | 1 | Representation of the NF Instance status notification. |

TABLE 4

| | NotificationData Type | | | | |
|---|---|---|---|---|---|
| Attribute name | Data type | P | Cardinality | Description | Applicability |
| event | NotificationEventType | M | 1 | Notification type. It shall take the values "NF_REGISTERED", "NF_DEREGISTERED" or "NF_PROFILE_CHANGED". | |
| nfInstanceUri | Uri | M | 1 | Uri of the NF Instance (see clause 6.1.3.3.2) associated to the notification event. | |
| nfProfile | NFProfile | C | 0 . . . 1 | New NF Profile or Updated NF Profile; it shall be present when the notification type is "NF_REGISTERED" and it may be present when the notification type is "NF_PROFILE_CHANGED". (NOTE 3) This IE, if present, shall not contain authorization attributes (such as the "allowedXXX" attributes | |

TABLE 4-continued

NotificationData Type

| Attribute name | Data type | P | Cardinality | Description | Applicability |
|---|---|---|---|---|---|
| profileChanges | array(ChangeItem) | C | 1 . . . N | of the NFProfile or NFService data types). List of changes on the profile of the NF Instance associated to the notification event; it may be present when the notification type is "NF_PROFILE_CHANGED" (see NOTE 1, NOTE 2). | |
| sharedDataChanges | array(ChangeItem) | C | 1 . . . N | List of changes on shared data; it shall be present when the notification type is "SHARED_DATA_CHANGED" (see NOTE 2). | Shared-Data-Retrieval |
| conditionEvent | ConditionEventType | C | 0 . . . 1 | Type of event indicating whether a change of NF Profile results in that the NF Instance starts or stops being part of a given set of NF Instances, as indicated in the subscription condition (see attribute "subscrCond" in clause 6.1.6.2.16). Type of event may also indicate whether a change of NF Profile results in that the NF Instance starts or stops being authorized to be accessed by the NF consumer, as specified in clause 5.2.2.6.2. It can take the value "NF_ADDED" (if the NF Instance starts being part of a given set or starts being authorized to be accessed by the NF consumer) or "NF_REMOVED" (if the NF Instance stops being part of a given set or stops being authorized to be accessed by the NF consumer). (NOTE 3) | |
| subscriptionContext | SubscriptionContext | C | 0 . . . 1 | It shall contain data related to the subscription to which this notification belongs to, such as the subscription ID and the subscription conditions. An NRF complying with this release of the specification shall include this attribute, to facilitate to the subscribing entity the identification of the subscription data, or context, that triggered this notification. | |
| completeNfProfile | NFProfile | C | 0 . . . 1 | Complete new NF Profile or updated NF Profile; it shall be present when the notification type is "NF_REGISTERED" and it may be present when the notification type is | |

TABLE 4-continued

NotificationData Type

| Attribute name | Data type | P | Cardinality | Description | Applicability |
|---|---|---|---|---|---|
| | | | | "NF_PROFILE_CHANGED". (NOTE 3) This IE shall only be present if the NRF supports the "Complete-Profile-Subscription" feature, the "completeProfileSubscription" attribute is present and set to true in the request (see clause 6.1.6.2.16) and if the requesting entity is authorized to subscribe to the complete profile of NF instances. This IE, if present, should contain the complete set of attributes (including, e.g. the "allowedXXX" attributes of the NFProfile or NFService data types). | |

NOTE 1:
If "event" attribute takes the value "NF_PROFILE_CHANGED", then one and only one of the "nfProfile", "profileChanges" or "completeNfProfile" attributes shall be present.
NOTE 2:
The NRF shall notify about NF Profile changes or shared data changes affecting attributes of type "array" only as a complete replacement of the whole array (i.e. it shall not notify about changes of individual array elements).
NOTE 3:
When a change in an NF Profile results in an NF to start being part of a given set or an NF Instance starts being authorized to be accessed by the NF consumer, the NRF shall indicate such condition by including the "conditionEvent" attribute with value "NF_ADDED", and it shall include in the notification the "nfProfile" attribute with the full NF Profile of the NF Instance; the "profileChanges" attribute shall not be included.
When a change in an NFProfile results in an NF to stop being part of a given set or an NF Instance stops being authorized to be accessed by the NF consumer, the NRF shall indicate such condition by including the "conditionEvent" attribute with value "NF_REMOVED", and it shall include in the notification either the "nfProfile" or the "profileChanges" attribute. The NRF should include the IE with less information if possible.

From Tables 3 and 4, there are attributes in the NotificationData that indicate NF profile changes; however, there is no attribute in the NotificationData that identifies NF discovery results affected by a change in NF profile data.

Returning to the message flow illustrated in FIG. 4, in step 2a, if NF service consumer 200 successfully processes the NFStatusNotify request message, NF service consumer 200 responds with a 204 No Content message. If NF service consumer 200 does not successfully process the NFStatusNotify request message, NF service consumer 200 responds with a 4xx or 5xx message indicating problem details. If NF service consumer 200 redirects the NFStatusNotify request message, NF service consumer 200 responds with a 3xx message indicating redirection.

Figure 5:
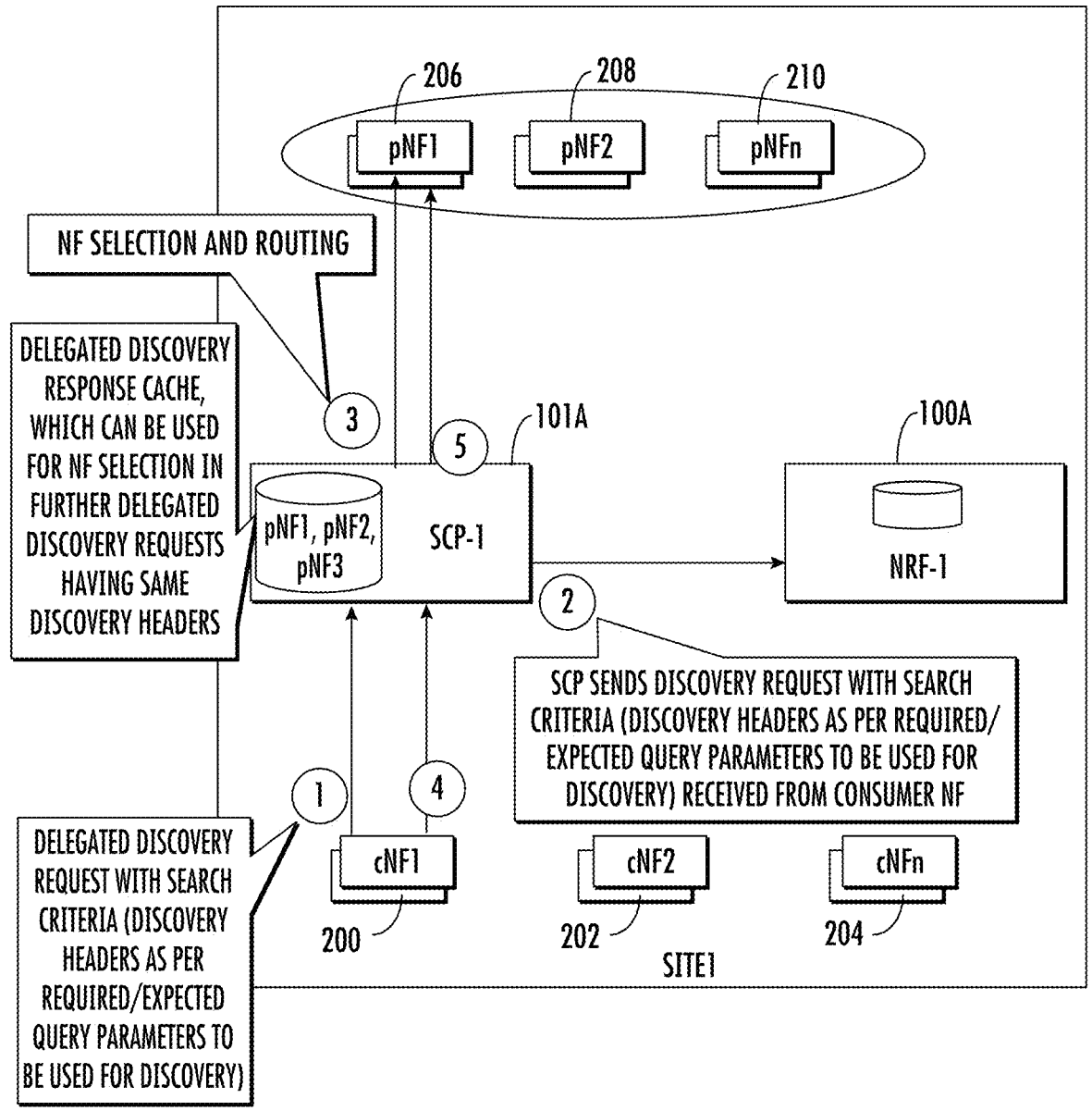
FIG. 5 is a network diagram illustrating network functions and messages involved in delegated discovery according to 3GPP communication model D.

FIG. 5 is a network diagram illustrating network functions and messages involved in delegated discovery according to 3GPP communication model D. In FIG. 5, it is assumed that NFs 200, 202, 204, 206, 208, and 210 have registered with NRF 100A. It is also assumed that SCP 101A has registered with NRF 100A and subscribed with NRF 100A for any NF profile change notifications regarding NFs 200, 202, 204, 206, 208, and 210. In step 1, SCP 101A receives, from consumer NF 200, a service request with NF discovery headers. In step 2, SCP 101A creates a delegated NF discovery request using the discovery headers received in step 1, sends the delegated NF discovery request to NRF 100A, and receives a delegated discovery response from NRF 100A. SCP 101A caches the received delegated discovery response. In step 3, SCP 101A selects producer NF 206 and routes the service request to producer NF 206. In step 4, SCP 101A receives a new service request having the same discovery headers as the service request in step 1. In step 5, SCP 101A performs NF selection based on the cached discovery response, assuming the cached discovery response is valid (i.e., the validityPeriod for the cached NF discovery response has not expired), selects producer NF 206, and routes the service request message to producer NF 206.

Figure 6:
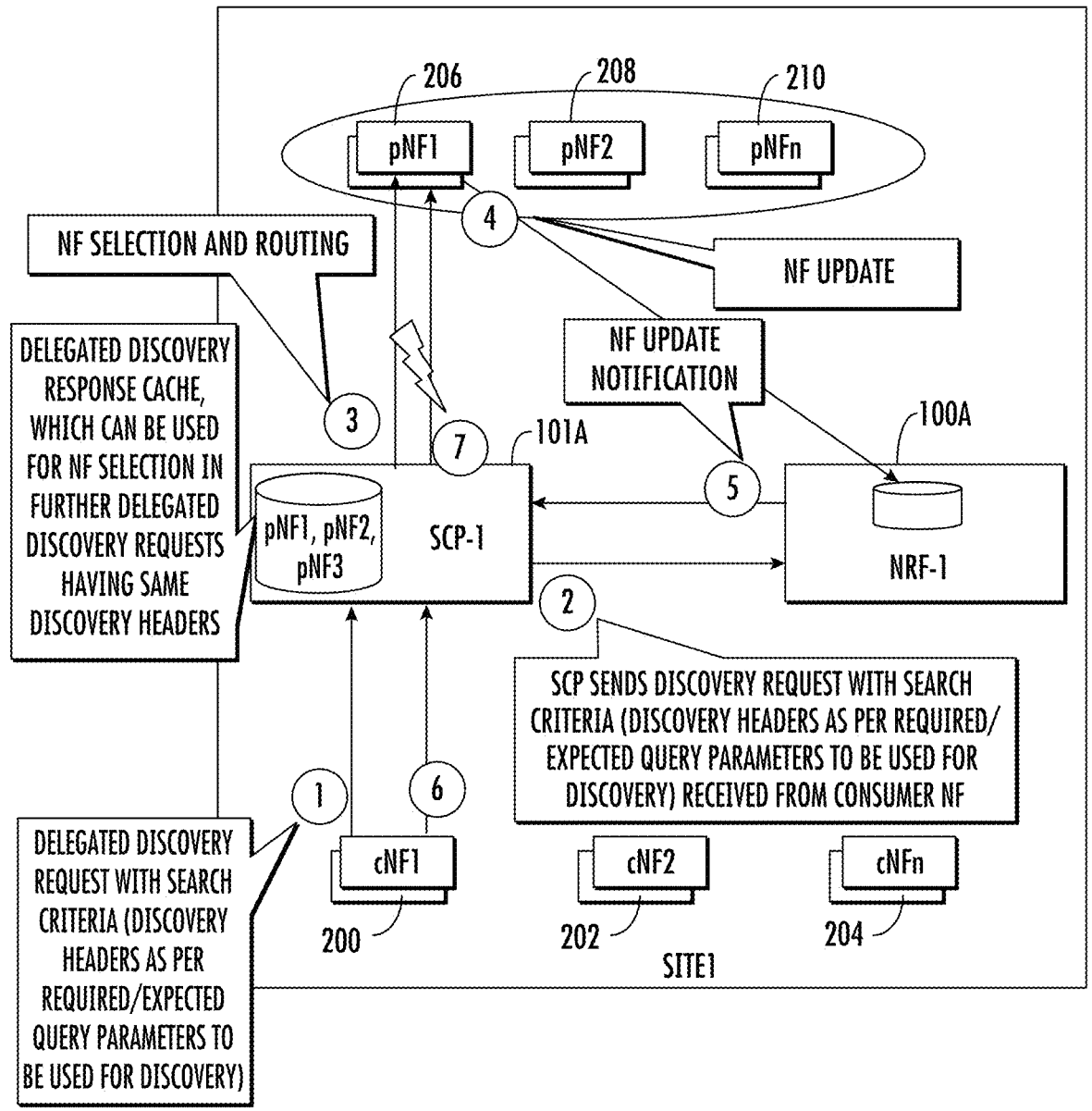
FIG. 6 is a network diagram illustrating a problem that can occur with SBI message routing using existing mechanisms for communicating NF profile updates to NF discovery service consumers.

FIG. 6 is a network diagram illustrating a problem that can occur with SBI message routing using existing mechanisms for communicating NF profile updates to NF discovery service consumers. In FIG. 6, it is assumed that NFs 200, 202, 204, 206, 208, and 210 have registered with NRF 100A. It is also assumed that SCP 101A has registered with NRF 100A and subscribed with NRF 100A for any NF profile change notifications regarding NFs 200, 202, 204, 206, 208, and 210. In step 1, SCP 101A receives, from consumer NF 200, a service request with NF discovery headers. In step 2, SCP 101A creates a delegated NF discovery request using the discovery headers received in step 1, sends the delegated NF discovery request to NRF 100A, and receives a delegated discovery response from NRF 100A. SCP 101A caches the received delegated discovery response. In step 3, SCP 101A selects producer NF 206 and routes the service request to producer NF 206. In step 4, producer NF 206 performs an NF update with NRF 100A to update NF profile attributes, which may have been used in responding to the delegated discovery request in step 2. In step 5, NRF 100A sends an NFStatusNotify request message to SCP 101A including the updated NF profile of producer NF 206. However, the NFStatusNotify request message does not indicate which NF profile attributes have been updated or which cached NF discovery responses are impacted by the change. As a result, SCP 101A continues using the current set of cached delegated discovery responses to perform NF selection in routing service request messages.

In step 6, SCP 101A receives a new service request having the same discovery headers as the service request in step 1. In step 7, SCP 101A performs NF selection based on the cached discovery response, selects producer NF 206, and routes the service request message to producer NF 206. However, because the change in the NF profile of producer NF 206 may have caused producer NF 206 to be an invalid selection for the service request, processing of the NF service request in step 7 may fail, requiring new NF selection and retransmission of the NF service request.

Figure 7:
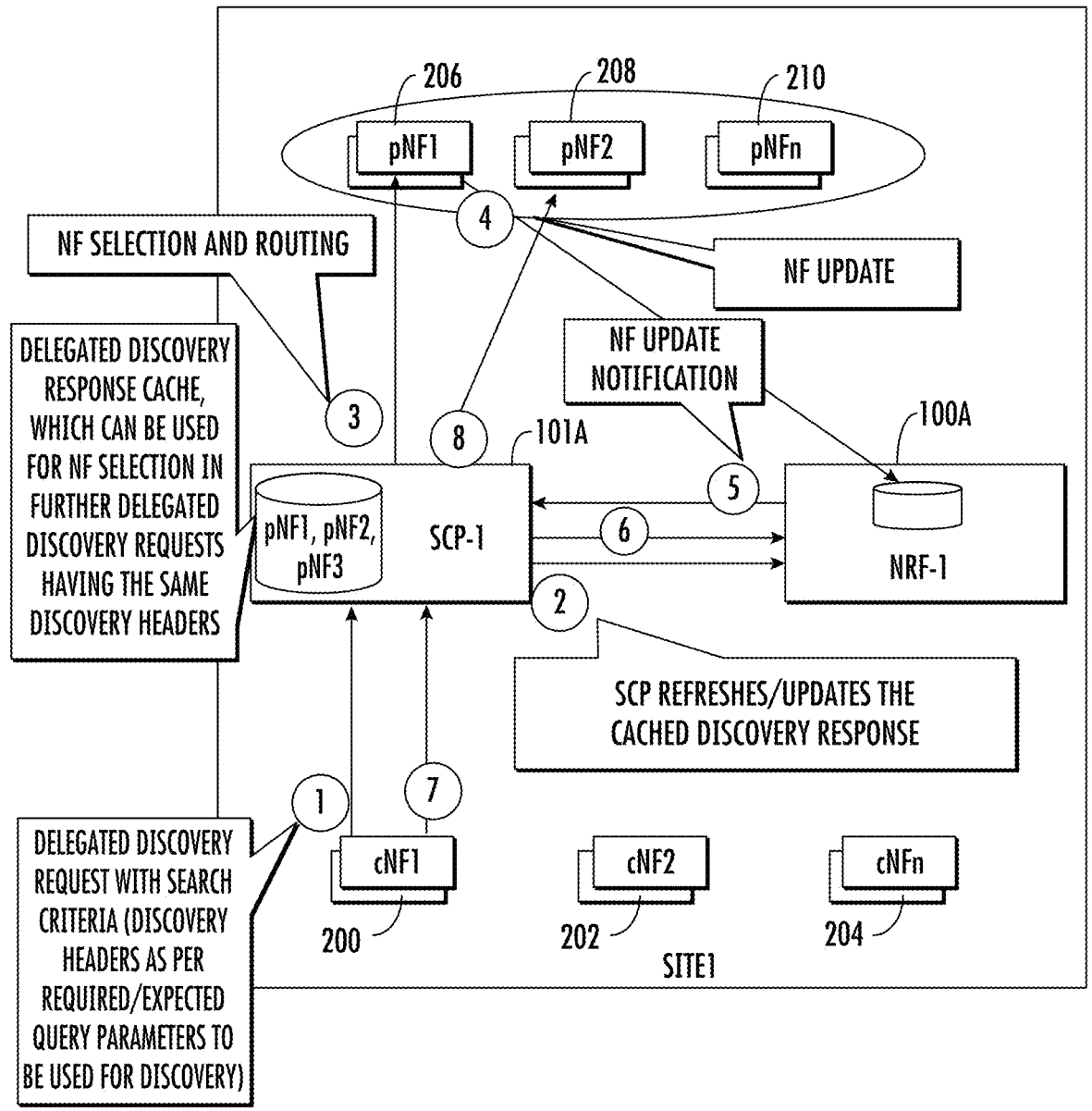
FIG. 7 is a network diagram illustrating the caching of NF discovery results at the NRF, including the searchIDs of each of the NF discovery results, the determination by the NRF of NF discovery results affected by an NF profile update, and the communication of the updated NF profile along with the searchIDs of affected NF discovery results to the SCP.

To address the difficulties of NF discovery service consumers in identifying cached NF discovery results impacted by an NF profile update, the NRF may determine NF discovery results that are impacted by an NF profile update and communicate identifiers of the impacted NF discovery results to NF discovery service consumers along with the corresponding updated NF profile(s). FIG. 7 is a network diagram illustrating the caching, at the NRF, of NF discovery results, including the searchIDs associated with each of the NF discovery results, the determination by the NRF of NF discovery results affected by an NF profile update, and the communication of the updated NF profile along with the searchIDs of affected NF discovery results to the SCP. Referring to FIG. 7, In step 1, SCP 101A receives, from consumer NF 200, a service request with discovery headers. In step 2, SCP 101A creates a delegated NF discovery request using the discovery headers received in step 1, sends the delegated NF discovery request to NRF 100A, and receives a delegated discovery response from NRF 100A. SCP 101A caches the received delegated discovery response to use in future delegated discovery requests. NRF 100A caches consumer NF information, query parameters used in generating the NF discovery response, the searchID, and the validityPeriod. NRF 100A also caches the NF discovery results, i.e., the list of NF instance IDs corresponding to the NF profiles provided in the NF discovery response so that the NF discovery results can be efficiently retrieved using the searchID when SCP 101A refreshes the NF discovery results associated with the same searchID and/or the same query parameters. In step 3, SCP 101A selects producer NF 206 and routes the service request to producer NF 206.

In step 4, producer NF 206 performs an NF update with NRF 100A to update NF profile attributes which may have been used in responding to the delegated discovery request in step 2. In this example, it is assumed that producer NF 206 updates one or more NF profile attributes (such as load) to make producer NF 206 an invalid candidate for a service request from consumer NF 200. NRF 100A will identify the cached NF discovery results affected by the NF update, update the cached NF discovery results, and update the affected NF profiles in the NF profiles database. In this case, updating the cached NF discovery results may include deleting the NF instance ID of producer NF 206 from the list of NF instance IDs in the NF discovery results cached in step 2. In step 5, NRF 100A sends an NFStatusNotify request message to SCP 101A including the updated NF profile of producer NF 206 and the searchIDs of any affected cached NF discovery responses.

In step 6, SCP 101A receives the NFStatusNotify request message, reads the searchIDs of impacted NF discovery results, refreshes the impacted NF discovery results by querying NRF 100A with the searchIDs. NRF 100A receives the NF discovery requests, uses the searchIDs to access the cached NF discovery results, and responds with any updated NF discovery results. After step 6, the cached NF discovery results maintained by SCP 101A are synchronized with the updated network topology/NF profile information maintained by NRF 100A. In addition, because the NRF updates its cached NF discovery results associated with each searchID, the NF discovery results can be efficiently obtained by consumer NFs seeking to refresh previously retrieved NF discovery results associated with a searchID. In this example, the refreshed NF discovery results may not include the NF profile of producer NF 206 because of the NF profile update in step 4.

In step 7, SCP 101A receives a new service request from consumer NF 200 having the same discovery headers as the service request in step 1. In step 8, SCP 101A performs NF selection based on the cached NF discovery response, selects producer NF 208, and routes the service request message to producer NF 208. Producer NF 208 is selected because producer NF 206 updated its NF profile in step 4 to make producer NF 206 an invalid NF selection for the service request from consumer NF 200. Because the NF selection is performed using cached NF discovery results that are synchronized with the NRF, the likelihood of routing a service request to an invalid producer NF is reduced.

In the example illustrated in FIG. 7, SCP 101A refreshes cached NF discovery results in response to receiving an NFStatusNotify request message containing searchIDs of impacted NF discovery results. In an alternate implementation, SCP 101A may refresh NF discovery results after receiving an NFStatusNotify request message with searchIDs of impacted NF discovery results and in response to receiving a new service or NF discovery request with the same query parameters as a previous NF discovery request or the same searchID obtained in response to a previous NF discovery request from an NF service consumer. Using FIG. 7 as an example, instead of refreshing impacted NF discovery results immediately after step 5, SCP 101A may refresh impacted NF discovery results in response to receiving the service request with the same query parameters and requiring delegated NF discovery in step 7.

In the example illustrated in FIG. 7, SCP 101A receives the list of searchIDs of impacted NF discovery results and refreshes the corresponding cached NF discovery results. However, the subject matter described herein is not limited to an SCP performing these steps. Any NF discovery service consumer, including a non-SCP NF discovery service consumer, can perform the steps for refreshing impacted NF discovery results in response to receiving an NFStatusNotify request message including the searchIDs of impacted NF discovery results.

The following is an example of processing performed by the NRF in caching NF discovery results, identifying cached NF discovery results impacted by an NF profile update, updating the cached NF discovery results in the cache maintained by the NRF, and communicating the searchIDs of impacted NF discovery results to an NF discovery service consumer.

1. The SCP receives a model D delegated discovery service request with the following discovery headers.
    1. 3gpp-Sbi-Discovery-target-nf-type:<target NF Type>
    2. 3gpp-Sbi-Discovery-requester-nf-type:<requester NF Type>
    3. 3gpp-Sbi-Discovery-service-names:<target NF service name(s)>

4. 3gpp-Sbi-Discovery-snssais: [{"sst": 1, "sd": "A08923"}]
 5. and more discovery headers having other query parameters as applicable.
2. The SCP creates the NF discovery request with query parameters as per the discovery headers and sends the NF discovery request to the NRF.
3. The NRF processes the NF discovery request and sends the NF discovery response having NF profiles of producer NF instances (with a validityPeriod) as follows:
 1. pNF1: Profile having sNssais=[{"sst": 1, "sd": "A08923"}, {"sst": 2, "sd": "0023F1"}], Priority=P1, Capacity=C1, etc.
 2. pNF2: Profile having sNssais=[{"sst": 1, "sd": "A08923"}, {"sst": 2, "sd": "0023F1"}], Priority=P1, Capacity=C2, etc.
 3. pNF3: Profile having sNssais=[{"sst": 1, "sd": "A08923"}, {"sst": 2, "sd": "0023F1"}], Priority=P1, Capacity=C3, etc.
4. The NRF maintains/stores the NFdiscovery response along with a unique cache key, i.e., the searchID, for a set of query parameters. If the same query parameters are received from consumer NFs in subsequent NF discovery requests, then the NRF can identify the duplicate/same query parameters and the cached discovery response can be used for NF discovery request processing. The NRF also maintains a mapping between the searchID and associated NF instances in the NF discovery response and the NF discovery service consumer NF information. For example, the NRF may maintain a database record that maps the following parameters to each other:
 1. cache record key=key1 (key1 is the searchID)
 2. Query parameters: target-nf-type, requester-nf-type, service-names and sNssais, etc.
 3. Associated NF instances: pNF1, pNF2, pNF3
 4. ConsumerInfo: SCP1
5. pNF1 updates its NF profile and sends an NFUpdate service request to update the supported sNssais= [{"sst": 2, "sd": "0023F1"}] i.e., pNF1 no longer supports {"sst": 1, "sd": "A08923"} slice.
6. The NRF processes the NFUpdate request and updates the NF profile of pNF1. The NRF also performs the following operations:
 1. identifies that the sNssais attribute is changed/updated in the pNF1 profile, which may impact NF discovery responses where the NF profile of pNF1 is part of the NF discovery response.
 2. identifies the impacted/affected cached discovery responses based on stored information (query parameters and associated NF profiles of NF instances) and changed attributes (sNssais) of pNF1.
  1. The NRF identifies that the key1 cache record is impacted because the NF discovery results will no longer include the NF profile of pNF1 due to the change in the sNssais attribute that corresponded to one of the query parameters, so the NRF will refresh/update the cached NF discovery response by deleting the NF instance ID of pNF1 to be used in responding any future NF discovery requests for the same query parameters.
7. The NRF sends the NF status notification to the SCP with impacted searchIDs. The following is an example of notification data that may be sent by the NRF:

| | |
|---|---|
| NotificationData: { | |
| description: | Data sent in notifications from NRF to subscribed NF Instances |
| event* | NotificationEventType{...} |
| nfInstanceUri* | Uristring<br>String providing an URI formatted according to RFC 3986. |
| nfProfile | {...} |
| profileChanges | [...] |
| conditionEvent | ConditionEventType{...} |
| subscriptionContext | SubscriptionContext{...} |
| completeNfProfile | NFProfile{...} |
| anyOf –> | {...}<br>{...}<br>{...}<br>{...} |
| "vendorSpecific-nnnnnn": | { impactedSearchIDList : [" key1"]} |
| } | |

From the example NotificationData above, the NRF communicates to the SCP the NF profiles with changed attributes, a list of changes to individual attributes in each changed NF profile, and a vendor-specific IE which contains the list of searchIDs corresponding to impacted NF discovery results. The SCP will use the list of searchIDs to identify cached NF discovery results affected by an NF profile update. The SCP will subsequently refresh the impacted NF discovery results by querying the NRF.
8. The SCP receives the NFStatusNotify request message with impacted searchIDs. The SCP processes the notification and refreshes/updates the impacted cached NF discovery responses from the NRF before using the cached discovery responses in any future delegated discovery requests or performing producer NF selection.

Figure 8:
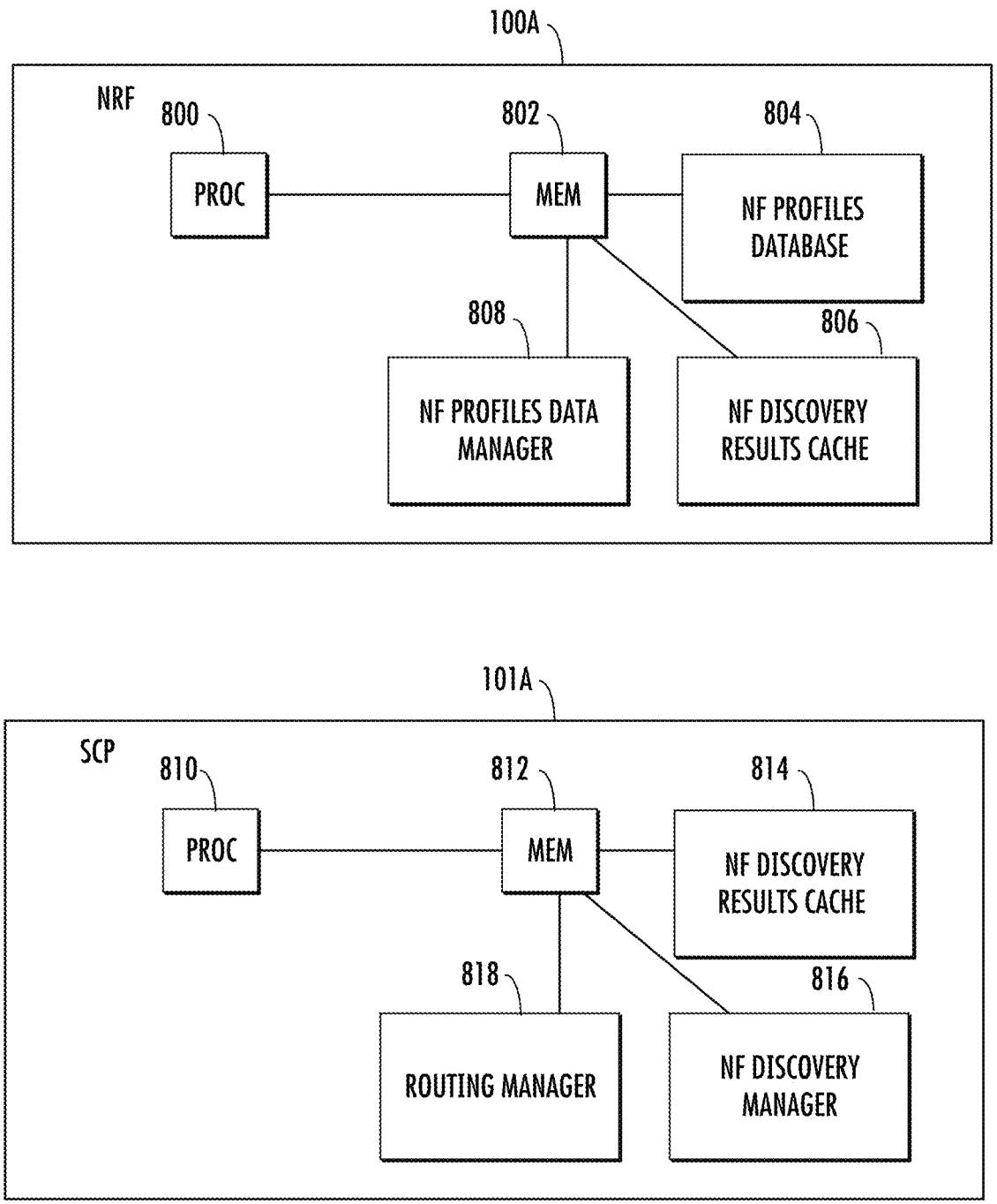
FIG. 8 is a block diagram illustrating exemplary architectures of an NRF and an NF discovery service consumer for indicating NF discovery results affected by an NF profile update.

FIG. 8 is a block diagram illustrating exemplary architectures of an NRF and an NF discovery service consumer for indicating NF discovery results affected by an NF profile update. Referring to FIG. 8, NRF 100A includes at least one processor 800 and memory 802. NRF 100A further includes an NF profiles database 804 that stores NF profiles of NFs that are registered with NRF 100A. NRF 100A further includes an NF discovery results cache 806 that stores cached NF discovery results, including the data described above. NRF 100A further includes an NF profiles data manager 808 that provides the discovery, registration, subscription, management and other interfaces to NF profiles database 804 described in 3GPP TS 29.510. NF profiles data manager 808 may also manage the storing of NF discovery results in NF discovery results cache 806. NF profiles data manager 808 may be implemented using computer executable instructions stored in memory 802 and executed by processor 800.

SCP 101A includes at least one processor 810 and memory 812. SCP 101A further includes an NF discovery results cache 814 that stores cached NF discovery results obtained from NRF 100A. SCP 101A further includes an NF discovery manager 816 that queries NRF 100A for NF discovery results and stores the results in NF discovery results cache 814. SCP 101A further includes a routing manager 818 that routes SBI request messages to producer NFs based on routing tables, which may be updated based on NF discovery results in NF discovery results cache 814.

Routing manager 818 and NF discovery manager 816 may be implemented using computer executable instructions stored in memory 812 and executed by processor 810.

Figure 9:
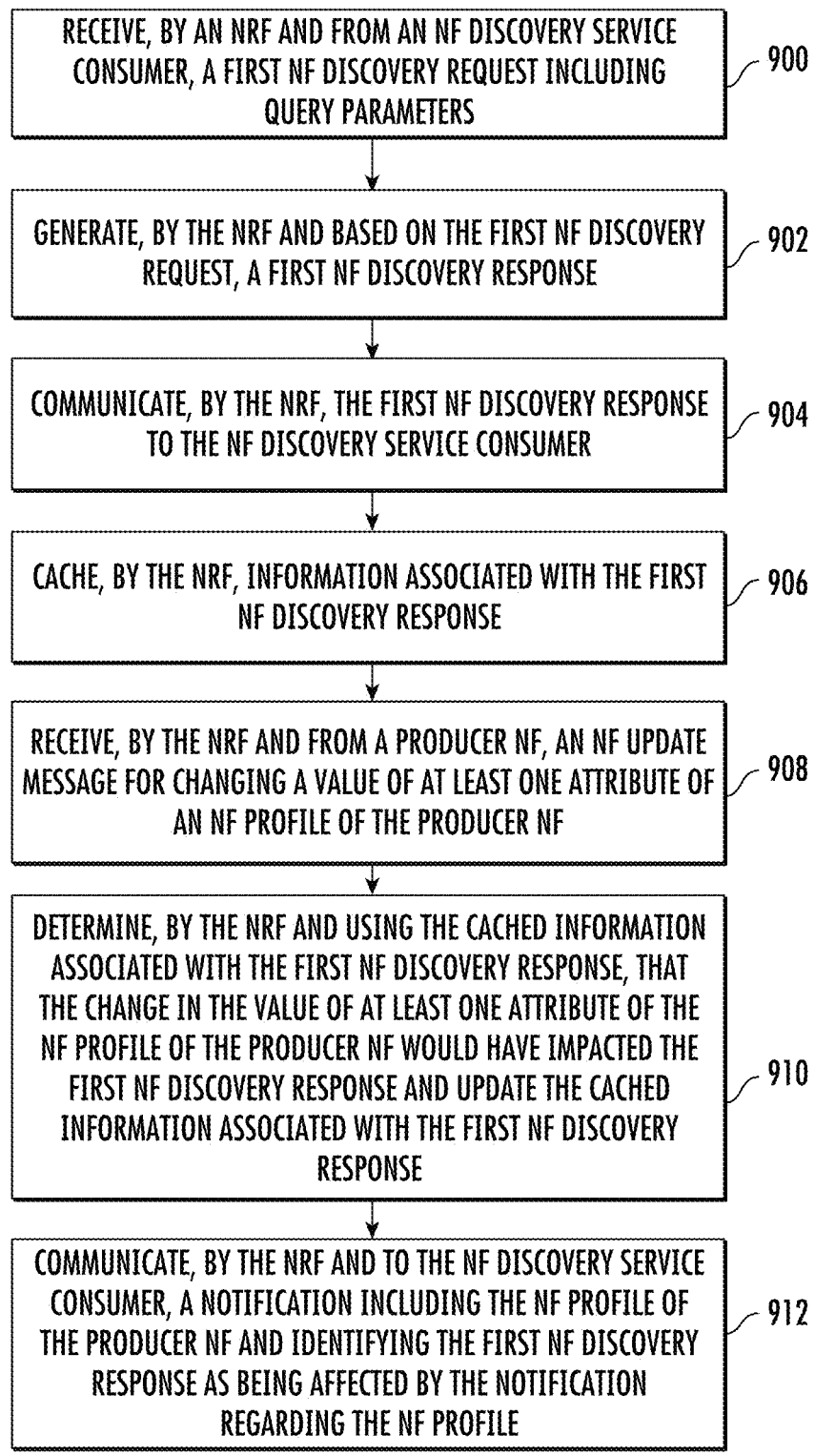
FIG. 9 is a flow chart illustrating an exemplary process for identifying, to an NF discovery service consumer, NF discovery results impacted by an NF profile update.

FIG. 9 is a flow chart illustrating an exemplary process for identifying, to an NF discovery service consumer, NF discovery results impacted by an NF profile update. Referring to FIG. 9, in step 900, the process includes receiving, by an NRF and from an NF discovery service consumer, a first NF discovery request including query parameters. For example, an NRF, such as NRF 100A, may receive an NFDiscover request from an SCP or a non-SCP NF discovery service consumer.

In step 902, the process further includes generating, by the NRF and based on the first NF discovery request, a first NF discovery response. For example, an NRF, such as NRF 100A, may query NF profiles database 804 using query parameters in the first NF discovery request, locate one or more matching NF profiles, and include the NF profiles in an NF discovery response.

In step 904, the process further includes communicating, by the NRF, the first NF discovery response to the NF discovery service consumer. For example, an NRF, such as NRF 100A, may transmit the NF discovery response to the NF discovery service consumer, such as SCP 101A or a non-SCP NF discovery service consumer.

In step 906, the process further includes caching, by the NRF, information associated with the first NF discovery response. For example, an NRF, such as NRF 100A, may cache the searchID, query parameters from the NF discovery request, NF instance ID of the NF discovery service consumer, and NF instance IDs of producer NFs whose NF profiles were included in the NF discovery response.

In step 908, the process further includes receiving, by the NRF and from a producer NF, an NF update message for changing a value of at least one attribute of an NF profile of the producer NF. For example, an NRF, such as NRF 100A, may receive an NFUpdate request message from a producer NF that updates one or more attributes of the NF profile of the producer NF. The NRF may update the corresponding NF profile in its NF profiles database.

In step 910, the process further includes determining, by the NRF and using the cached information associated with the first NF discovery response, that the change in the value of at least one attribute of the NF profile of the producer NF would have impacted the first NF discovery response and updating the cached information associated with the first NF discovery response. For example, an NRF, such as NRF 100A, may identify cached NF discovery results with query parameters that match the changed NF profile attributes or that include the NF profile of the producer NF that changed its NF profile. The NRF may also update the cached NF discovery results stored at the NRF associated with the searchID. For example, if the NFUpdate message caused attributes of an NF profile of a producer NF to no longer match the query parameters, updating the cached information associated with the first NF discovery response may include updating the list of NF instance IDs of the producer NFs that matched the query parameters in the first NF discovery request to remove the NF instance ID corresponding to the NF profile whose attributes no longer match the query parameters. Caching the updated NF discovery results along with the searchID enables the NF discovery results to be efficiently refreshed by an NF discovery service consumer by sending an NF discovery query message including the searchID.

In step 912, the process further includes communicating, by the NRF and to the NF discovery service consumer, a notification message including the NF profile of the producer NF and identifying the first NF discovery response as an impacted NF discovery response. For example, an NRF, such as NRF 100A, may send an NFStatusNotify request message to the NF discovery service consumer including the changed NF profile and including the searchID(s) of any cached NF discovery results affected by the change in the NF profile. The NF discovery service consumer that receives the NFStatusNotify request message uses the searchID to locate any affected cached NF discovery results and either refreshes the affected NF discovery results immediately in response to the NFStatusNotify request message or when a new NF discovery request containing the same query parameters as a cached NF discovery request is received by the NRF. Refreshing the NF discovery results includes sending a new NF discovery request to the NRF. The NRF may respond with the updated NF profiles that match the query parameters.

Exemplary advantages of the subject matter described herein include providing an increased likelihood of maintaining synchronization between NF topology information maintained by the NRF and that maintained by NF discovery service consumers. Another advantage of the subject matter described herein is that the likelihood of selecting an invalid or unavailable NF service producer is reduced. Yet another advantage of the subject matter described herein is reducing the processing burden on NF discovery service consumers by communicating the identities of affected NF discovery search results to the NF discovery service consumers. Routing latency is reduced by the subject matter described herein because the likelihood of a required retransmission to an alternate NF service producer is reduced.

The disclosure of each of the following references is hereby incorporated herein by reference in its entirety.

REFERENCES

1. $3^{rd}$ Generation Partnership Project; Technical Specification Group Core Network and Terminals; 5G System; Network Function Repository Services; Stage 3 (Release 18) 3GPP TS 29.510 V18.6.0 (2024 March)
2. $3^{rd}$ Generation Partnership Project; Technical Specification Group Services and System Aspects; System architecture for 5G System (5GS); Stage 2 (Release 18) 3GPP TS 23.501 V18.5.0 (2024 March)

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for identifying, to network function (NF) discovery service consumers, NF discovery results impacted by an NF profile update, the method comprising:
   receiving, by an NF repository function (NRF) and from an NF discovery service consumer, a first NF discovery request including query parameters;
   generating, by the NRF and based on the first NF discovery request, a first NF discovery response;
   communicating, by the NRF, the first NF discovery response to the NF discovery service consumer;
   caching, by the NRF, information associated with the first NF discovery response;

receiving, by the NRF and from a producer NF, an NF update message for changing a value of at least one attribute of an NF profile of the producer NF;

determining, by the NRF and using the cached information associated with the first NF discovery response, that the change in the value of at least one attribute of the NF profile of the producer NF would have impacted the first NF discovery response and updating the cached information associated with the first NF discovery response; and communicating, by the NRF and to the NF discovery service consumer, a notification message including the NF profile of the producer NF and identifying the first NF discovery response as an impacted NF discovery response.

2. The method of claim 1 wherein the NF discovery service consumer comprises a service communication proxy (SCP) and receiving the first NF discovery request includes receiving a delegated NF discovery request originating from the SCP according to 3GPP communication model D.

3. The method of claim 1 wherein the NF discovery service consumer comprises a non-SCP NF discovery service consumer and receiving the first NF discovery request includes receiving an NF discovery request originating from the non-SCP NF discovery service consumer using 3GPP communication model B or C.

4. The method of claim 1 wherein generating the first NF discovery response includes performing a lookup in an NF profiles database using the query parameters from the first NF discovery request, locating NF profiles corresponding to the query parameters, and including the NF profiles in the first NF discovery response.

5. The method of claim 4 wherein caching information associated with the first NF discovery response includes caching the query parameters, a list of NF instance identifiers of producer NFs whose NF profiles have attributes that match the query parameters, an NF instance identifier of the NF discovery service consumer, and a searchID associated with the first NF discovery response.

6. The method of claim 5 wherein updating cached information associated with the first NF discovery response includes updating the list of NF instance identifiers of producer NFs whose NF profiles have attributes that match the query parameters.

7. The method of claim 5 wherein determining that the change in the value of at least one attribute of the NF profile of the producer NF would have impacted the first NF discovery response includes determining that the value of the at least one attribute corresponds to one of the query parameters and/or that the NF profile of the producer NF was included in the first NF discovery response.

8. The method of claim 5 wherein communicating the notification message including the NF profile of the producer NF and identifying the first NF discovery response as an impacted NF discovery response comprises including the searchID in the notification message.

9. The method of claim 8 comprising receiving, by the NF discovery service consumer, the notification message identifying the first NF discovery response as an impacted NF discovery response and refreshing NF discovery results associated with the first NF discovery response.

10. The method of claim 9 wherein refreshing the NF discovery results associated with the first NF discovery response includes transmitting, to the NRF, a second NF discovery request including the query parameters and/or the searchID and, at the NRF, using the cached information associated with the first NF discovery request that was updated in response to the NF update message to respond to the second NF discovery request.

11. A system for identifying, to network function (NF) discovery service consumers, cached NF discovery results impacted by an NF profile update, the system comprising:

an NF repository function (NRF) including at least one processor and a memory; and an NF profiles data manager implemented by the at least one processor for receiving, from an NF discovery service consumer, a first NF discovery request including query parameters, generating, based on the NF discovery request, a first NF discovery response, communicating the first NF discovery response to the NF discovery service consumer, caching information associated with the first NF discovery response, receiving, from a producer NF, an NF update message for changing a value of at least one attribute of an NF profile of the producer NF, determining, using the cached information associated with the first NF discovery response, that the change in the value of the at least one attribute of the NF profile of the producer NF would have impacted the first NF discovery response, updating the cached information associated with the first NF discovery response, and communicating, to the NF discovery service consumer, a notification message including the NF profile of the producer NF and identifying the first NF discovery response as an impacted NF discovery response.

12. The system of claim 11 wherein the NF discovery service consumer comprises a service communication proxy (SCP) and the NF discovery request includes a delegated NF discovery request originating from the SCP according to 3GPP communication model D.

13. The system of claim 11 wherein the NF discovery service consumer comprises a non-SCP NF discovery service consumer and the first NF discovery request includes an NF discovery request originating from the non-SCP NF discovery service consumer using 3GPP communication model B or C.

14. The system of claim 11 wherein the NF profiles data manager is configured to generate the first NF discovery response by performing a lookup in an NF profiles database using the query parameters from the first NF discovery request, locating NF profiles corresponding to the query parameters, and including the NF profiles in the first NF discovery response.

15. The system of claim 14 wherein the NF profiles data manager is configured to cache the query parameters, a list of NF instance identifiers of producer NFs whose NF profiles have attributes that match the query parameters, an NF instance identifier of the NF discovery service consumer, and a searchID associated with the first NF discovery response.

16. The system of claim 15 the NF profiles data manager is configured to update the cached information associated with the first NF discovery response by updating the list of NF instance identifiers of producer NFs whose NF profiles have attributes that match the query parameters.

17. The system of claim 15 wherein the NF profiles data manager is configured to determine that the change in the value of at least one attribute of the NF profile of the producer NF would have impacted the first NF discovery response by determining that the value of the at least one attribute corresponds to one of the query parameters and/or that the NF profile of the producer NF was included in the first NF discovery response.

18. The system of claim 15 wherein the notification message includes the searchID.

19. The system of claim 18 comprising the NF discovery service consumer, wherein the NF discovery service consumer is configured to receive the notification message identifying the first NF discovery response as an impacted NF discovery response and refresh NF discovery results associated with the first NF discovery response by transmitting, to the NRF, a second NF discovery request including the query parameters and/or the searchID and, at the NRF, using the cached information associated with the first NF discovery request that was updated in response to the NF update message to respond to the second NF discovery request.

20. A non-transitory computer readable medium having stored thereon executable instructions that when executed by a processor of a computer control the computer to perform steps comprising:

receiving, by a network function (NF) repository function (NRF) and from an NF discovery service consumer, an NF discovery request including query parameters;

generating, by the NRF and based on the NF discovery request, an NF discovery response;

communicating, by the NRF, the NF discovery response to the NF discovery service consumer;

caching, by the NRF, information associated with the NF discovery response;

receiving, by the NRF and from a producer NF, an NF update message for changing a value of at least one attribute of an NF profile of the producer NF;

determining, by the NRF and using the cached information associated with the NF discovery response, that the change in the value of at least one attribute of the NF profile of the producer NF would have impacted the NF discovery response and updating the cached information associated with the first NF discovery response; and communicating, by the NRF and to the NF discovery service consumer, a notification message including the NF profile of the producer NF and identifying the NF discovery response as an impacted NF discovery response.

* * * * *